(12) United States Patent
Unno (10) Patent No.: US 10,005,490 B2
(45) Date of Patent: Jun. 26, 2018

(54) ELECTRIC POWER STEERING APPARATUS

(71) Applicant: NSK LTD., Shinagawa-ku, Tokyo (JP)

(72) Inventor: Kentaro Unno, Maebashi (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 14/779,796

(22) PCT Filed: Jun. 12, 2014

(86) PCT No.: PCT/JP2014/065566
§ 371 (c)(1),
(2) Date: Sep. 24, 2015

(87) PCT Pub. No.: WO2014/200051
PCT Pub. Date: Dec. 18, 2014

(65) Prior Publication Data
US 2016/0046322 A1 Feb. 18, 2016

(30) Foreign Application Priority Data
Jun. 14, 2013 (JP) .................................. 2013-125271

(51) Int. Cl.
*B62D 6/10* (2006.01)
*G01L 5/22* (2006.01)
(Continued)

(52) U.S. Cl.
CPC ............. *B62D 6/10* (2013.01); *B62D 5/0409* (2013.01); *G01L 3/105* (2013.01); *G01L 5/221* (2013.01)

(58) Field of Classification Search
CPC ......... B62D 5/0409; B62D 6/10; G01L 3/105; G01L 5/221
(Continued)

(56) References Cited

U.S. PATENT DOCUMENTS 6,360,841 B1* 3/2002 Blandino ................ G01L 5/221
180/443
2005/0236222 A1* 10/2005 Chikaraishi .......... B62D 5/0409
180/444
(Continued)

FOREIGN PATENT DOCUMENTS

CN 2725145 Y 9/2005
CN 101278178 A 10/2008
(Continued)

OTHER PUBLICATIONS

International Search Report dated Sep. 9, 2014 issued by the International Searching Authority in counterpart International Application No. PCT/JP2014/065566.
(Continued)

*Primary Examiner* — Jacob D Knutson
*Assistant Examiner* — Felicia L. Brittman
(74) *Attorney, Agent, or Firm* — Sughrue Mion, PLLC (57) ABSTRACT

An electric power steering apparatus includes an input shaft, an output shaft, a torsion bar coaxially coupling the input and output shafts to each other, and a torque detection sleeve. One of the input and output shafts includes a cylindrical portion. On the inner peripheral surface of the cylindrical portion, a female stopper is provided. The other of the input and output shafts includes a male stopper to be engaged with the female stopper, and a torque detection concave-convex section adjacent to the male stopper in the axial direction. The male stopper includes a plurality of male grooves. The torque detection concave-convex section includes a plurality of detection grooves. The torque detection sleeve is arranged radially outside the torque detection concave-convex section. The diameter of a groove bottom circle of the male stopper is smaller than the diameter of a (Continued)

groove bottom circle of the torque detection concave-convex section.

5 Claims, 9 Drawing Sheets

(51) Int. Cl.
 *G01L 3/10* (2006.01)
 *B62D 5/04* (2006.01)
(58) Field of Classification Search
 USPC .......................................................... 180/444
 See application file for complete search history.

(56) References Cited

U.S. PATENT DOCUMENTS

| | | | | |
|---|---|---|---|---|
| 2009/0050399 A1* | 2/2009 | Segawa | ..................... | B62D 1/20 |
| | | | | 180/444 |
| 2009/0050400 A1* | 2/2009 | Segawa | ................ | B62D 5/0403 |
| | | | | 180/446 |
| 2009/0255349 A1 | 10/2009 | Segawa | | |
| 2015/0175198 A1 | 6/2015 | Shigeta | | |

FOREIGN PATENT DOCUMENTS

| | | |
|---|---|---|
| CN | 104487316 A | 4/2015 |
| GB | 2402916 A | 12/2004 |
| JP | 2000-146721 A | 5/2000 |
| JP | 2010-2382 A | 1/2010 |
| JP | 2013-83531 A | 5/2013 |
| WO | 03/104065 A1 | 12/2003 |
| WO | 2011/065491 A1 | 6/2011 |

OTHER PUBLICATIONS

Written Opinion dated Sep. 9, 2014 issued by the International Searching Authority in counterpart International Application No. PCT/JP2014/065566.

Communication dated May 24, 2016, from the Japanese Patent Office in counterpart application No. 2015-522852.

Communication dated Sep. 27, 2016 issued by the State Intellectual Property Office of P.R. China in counterpart Chinese Application No. 201480017778.1.

Communication dated Sep. 20, 2016 issued by the European Patent Office in counterpart European Application No. 14810154.6.

* cited by examiner

ELECTRIC POWER STEERING APPARATUS

TECHNICAL FIELD

The present invention relates to an electric power steering apparatus configured so that the force required for a driver to operate a steering wheel can be reduced by using an electric motor as an auxiliary power source.

BACKGROUND ART

Figure 6:
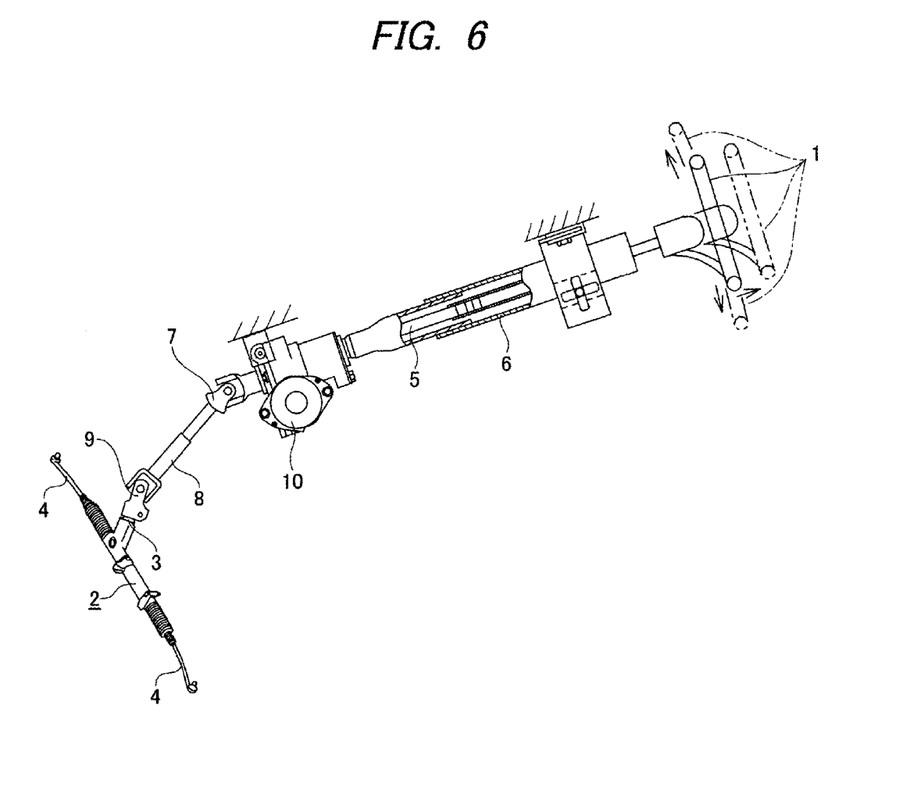
FIG. 6 is a partially-sectional side view of an example of a conventionally known steering apparatus.

A steering apparatus for a vehicle is configured as illustrated in FIG. 6, so that the rotation of a steering wheel 1 can be transmitted to an input shaft 3 of a steering gear unit 2 to push or to pull a pair of right and left tie rods 4 in accordance with the rotation of the input shaft 3, and thus, a steering angle is applied to front wheels. The steering wheel 1 is supported and fixed on the rear end portion of a steering shaft 5. The steering shaft 5, with a cylindrical steering column 6 inserted therethrough along an axial direction, is rotatably supported on the steering column 6 supported on a vehicle body. The front end portion of the steering shaft 5 is connected via a universal joint 7 to the rear end portion of an intermediate shaft 8, and the front end portion of the intermediate shaft 8 is connected via another universal joint 9 to the input shaft 3. An example illustrated in this drawing is an electric power steering apparatus by which the force necessary for operating the steering wheel 1 is reduced with an electric motor 10 used as an auxiliary power source. Herein, a front-rear direction refers to a front-rear direction of a vehicle unless otherwise mentioned.

Figure 7:
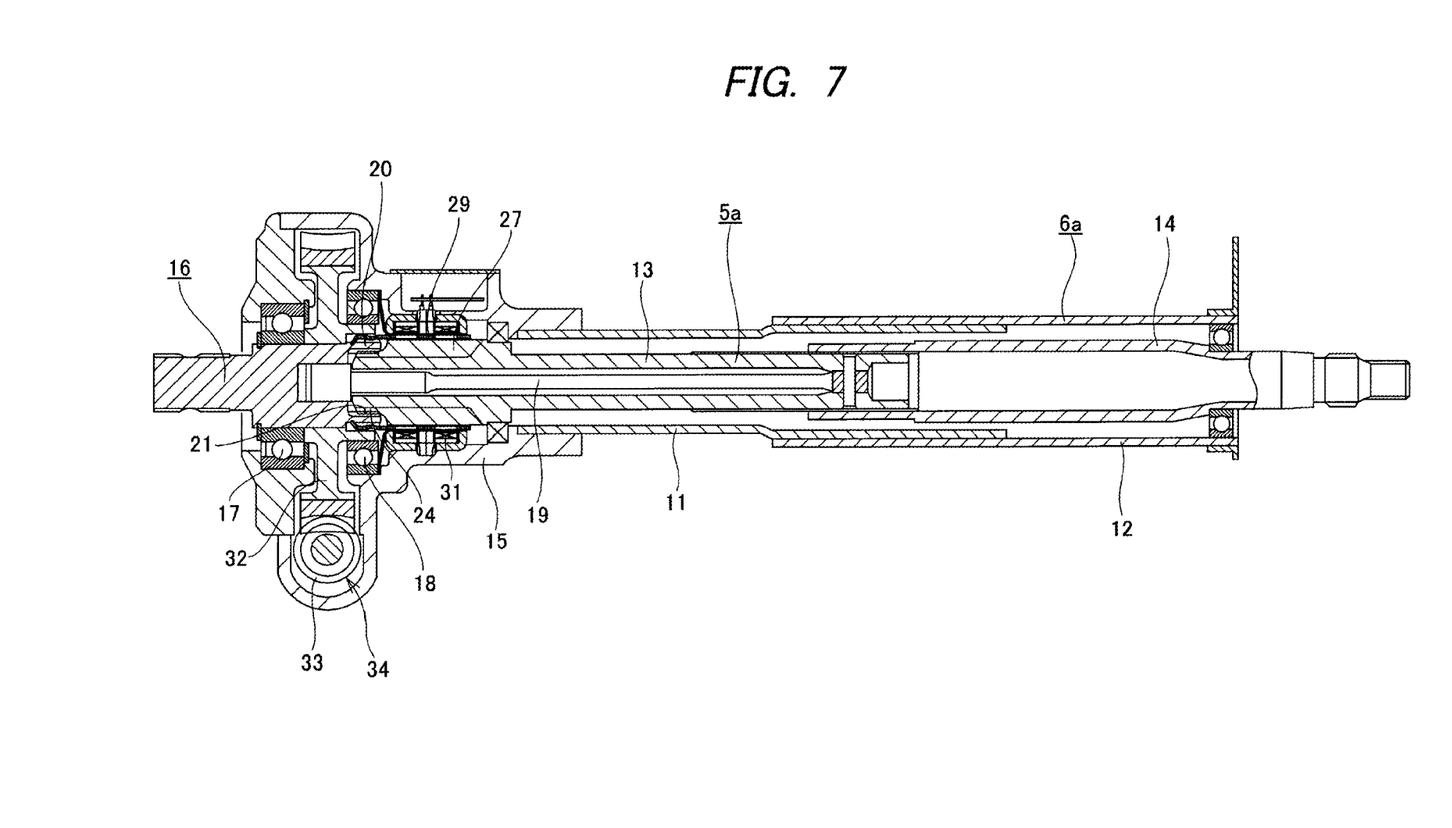
FIG. 7 is a cross-sectional view of an example of a conventional structure of an electric power steering apparatus.
Figure 8:
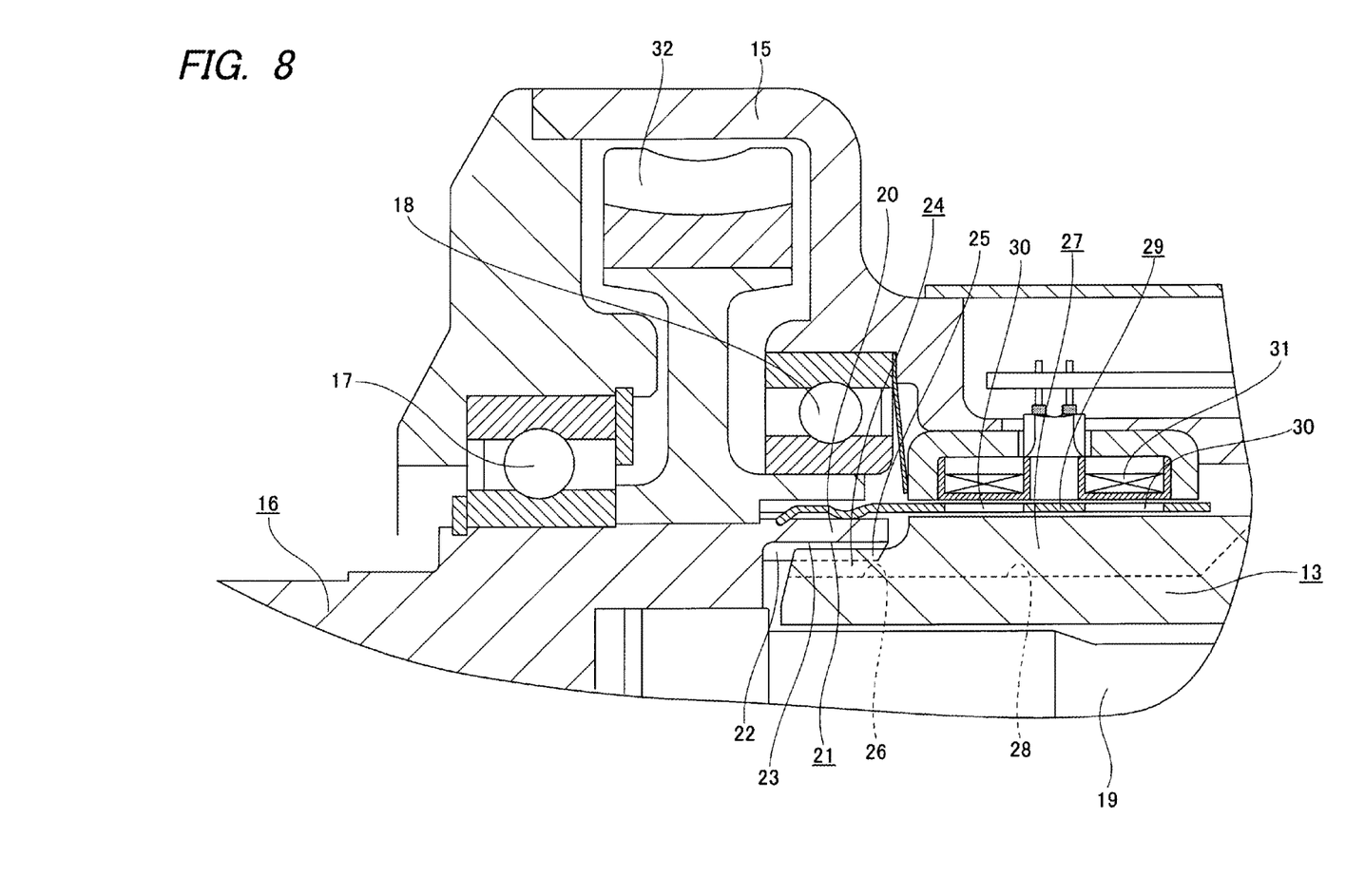
FIG. 8 is an enlarged view of an upper left portion of FIG. 11.
Figure 9:
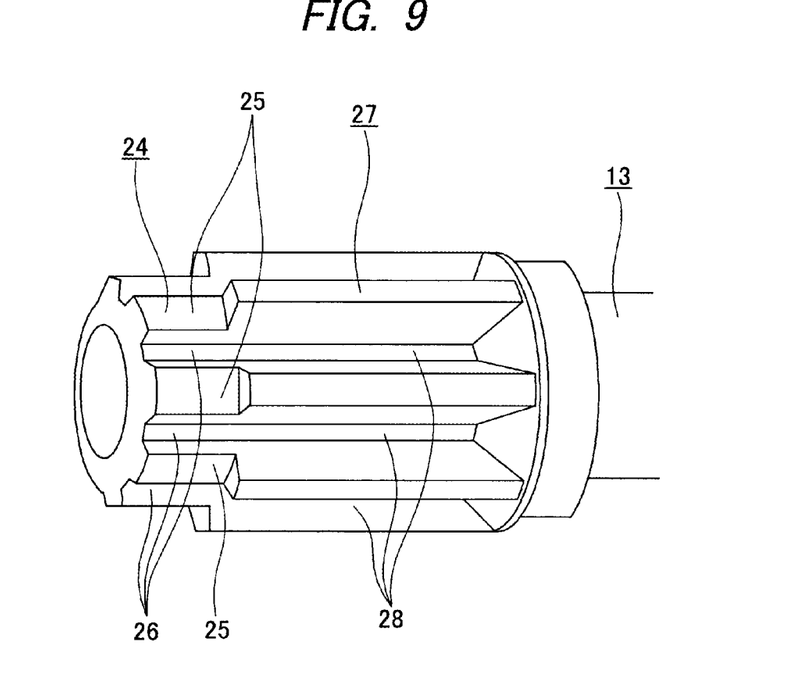
FIG. 9 is a perspective view of a front portion of a lower shaft.

FIGS. 7 to 9 illustrate an electric power steering apparatus disclosed in Patent Document 1. A steering column 6a is configured by combining an inner column 11 and an outer column 12 so that the total length thereof can be reduced at the time of secondary collision, and is supported on a vehicle body. A steering shaft 5a rotatably supported inside the steering column 6a is configured by combining a lower shaft 13 and an upper shaft 14 so that a torque can be transmitted and that the total length thereof can be reduced at the time of secondary collision. On the rear end portion of the upper shaft 14 protruded from a rear end opening of the outer column 12, a steering wheel 1 (see FIG. 6) is fixed. The front end portion of the inner column 11 is securely joined to a housing 15, and a front part of the lower shaft 13 is inserted into the housing 15. Inside the housing 15, an output shaft 16 is rotatably supported by a pair of ball bearings 17 and 18 on a front side of the lower shaft 13 working as an input shaft. The front end portion of the output shaft 16 protruded from a front end opening of the housing 15 is joined to a universal joint 7 (see FIG. 6). The output shaft 16 and the lower shaft 13 are coupled to each other via a torsion bar 19. Almost all the portion of the torsion bar 19 except its front end portion is disposed on the radially inner side of the lower shaft 13 formed in the shape of a hollow shaft.

The rear end portion of the output shaft 16 is provided with a cylindrical portion 20. On the inner peripheral surface of the cylindrical portion 20, a female stopper 21 having a concave-convex profile along the circumferential direction is provided. The female stopper 21 includes, on the inner peripheral surface of the cylindrical portion 20, a plurality of female teeth 22 and a plurality of female grooves 23. The plural female teeth 22 and the plural female grooves 23 extend in the axial direction and are arranged alternately along the circumferential direction at equal pitches. A front end portion of the outer peripheral surface of the lower shaft 13 has a male stopper 24 having a concave-convex profile along the circumferential direction. The male stopper 24 has, on the front end portion of the outer peripheral surface of the lower shaft 13, a plurality of male teeth 25 and a plurality of male grooves 26. The male teeth 25 and the male grooves 26 extend in the axial direction and are arranged alternately along the circumferential direction at equal pitches. The number of the male teeth 25 (the male grooves 26) and the number of female grooves 23 (the female teeth 22) are the same. The male stopper 24 and the female stopper 21 are engaged with each other in a concave-convex engaging manner (like a loose spline-engagement) so as to be relatively rotatable within a given angle range (e.g., ±5 degrees from a neutral state where the torsion bar 19 is not twisted). Thus, the torsion bar 19 is prevented from excessively twisting.

The lower shaft 13 is made of steel, that is, a magnetic metal. An outer peripheral surface of a portion of the lower shaft 13 near its front end and adjacent to the rear side of the male stopper 24 with respect to the axial direction is provided with a torque detection concave-convex section 27 having a concave-convex profile along the circumferential direction and having a circumscribed circle with a larger diameter than the male stopper 24. This torque detection concave-convex section 27 is configured by providing, on the circumference of the portion of the lower shaft 13 near its front end, a plurality of detection grooves 28 respectively extending in the axial direction at equal intervals in the circumferential direction. In the structure illustrated in this drawing, the diameter of a groove bottom circle of the torque detection concave-convex section 27 and the diameter of a groove bottom circle of the male stopper 24 are the same. The number of detection grooves 28 and the number of male grooves 26 are the same, and the male grooves 26 and the detection grooves 28 are provided continuously (in a state having the same phase along the circumferential direction) in the axial direction.

On the radially outer side of the torque detection concave-convex section 27, a torque detection sleeve 29 in a cylindrical shape made of a nonmagnetic metal having conductivity such as an aluminum alloy is provided. The base end portion of the torque detection sleeve 29 is fitted outside and fixed on the cylindrical portion 20. In a portion of the torque detection sleeve 29 positioned on the radially outer side of the torque detection concave-convex section 27, a plurality of window holes 30 are provided. On the radially outer side of the torque detection concave-convex section 27 and the torque detection sleeve 29, a torque detection coil unit 31 securely fitted in the housing 15 is provided.

A worm wheel 32 is fitted outside and fixed on a portion of the output shaft 16 near its rear end. The worm wheel 32 is engaged with a worm 33 rotatably supported in the housing 15. In the housing 15, an electric motor 10 (see FIG. 6) is supported and fixed. The output shaft of the electric motor 10 is joined to the base end portion of the worm 33 to be capable of transmitting a torque.

In the electric power steering apparatus configured as described above, when a torque corresponding to a steering force is applied to the steering shaft 5a by a driver operating the steering wheel 1, the torsion bar 19 is elastically twisted (within the given angle range) in accordance with the direction and the size of this torque. This elastic twist changes the positional relationship in the circumferential direction between the torque detection concave-convex section 27 and the torque detection sleeve 29, and hence an impedance change is caused in a coil of the torque detection coil unit 31. On the basis of this impedance change, the direction and the size of the torque can be detected. The electric motor generates auxiliary power in accordance with the detection result of the torque. The auxiliary power is increased by a worm speed reducer 34 configured by engaging the worm 33 and the worm wheel 32 with each other, and then applied to the output shaft 16. As a result, the force required for the driver to operate the steering wheel 1 is reduced.

On the other hand, when the amount of twist of the torsion bar 19 reaches an upper limit value on one side or the other side of the given angle range because of a large torque input from the steering wheel 1 to the steering shaft 5*a*, the teeth 22, 25 of the female stopper 21 and the male stopper 24 are engaged with each other in the circumferential direction. Then, on the basis of this engagement, a part of the toque is directly transmitted from the lower shaft 13 to the output shaft 16.

In the electric power steering apparatus described above, the thickness in the radial direction of a portion of the cylindrical portion 20 disposed on the radially outer side of the groove bottom circle of the female stopper 21, and the height in the radial direction of the respective female teeth 22 are set to dimensions for sufficiently securing the mechanical strength of the cylindrical portion 20, namely, set to dimensions not causing plastic torsional deformation of the cylindrical portion 20 in the torque transmission performed based on the engagement between the teeth 22, 25 of the female stopper 21 and the male stopper 24 described above.

In such an electric power steering apparatus, if the diameter of the circumscribed circle of the torque detection concave-convex section 27 is to be reduced for reducing the diameters of the respective components for the torque detection and portions around them, it is necessary to also reduce the inner diameter dimension of the torque detection sleeve 29 in accordance with the diameter of the circumscribed circle of the torque detection concave-convex section 27. Besides, in accordance with the inner diameter dimension of the torque detection sleeve 29, it is necessary to reduce the outer diameter dimension of the cylindrical portion 20 onto which the base end portion of the torque detection sleeve 29 is inserted and fixed. In this case, in order to retain the mechanical strength of the cylindrical portion 20, if the outer diameter dimension of the cylindrical portion 20 is to be reduced without changing the thickness in the radial direction of the portion of the cylindrical portion 20 disposed on the radially outer side of the groove bottom circle of the female stopper 21 and the height in the radial direction of the respective female teeth 22, it is necessary to reduce also the diameters of the circumscribed circle and the groove bottom circle of the male stopper 24 in accordance with the diameter dimension of the cylindrical portion 20 for avoiding interference between the tooth tops and the groove bottoms of the female stopper 21 and the male stopper 24.

In the configuration employed by the above-described conventional structure, however, the diameter of the groove bottom circle of the male stopper 24 and the diameter of the groove bottom circle of the torque detection concave-convex section 27 are the same. Therefore, if the diameter of the groove bottom circle of the male stopper 24 is reduced as described above, the diameter of the groove bottom circle of the torque detection concave-convex section 27 is also accordingly reduced. In accordance with this diameter reduction, in the portion of the lower shaft 13 near its front end, the thickness in the radial direction of a portion on the radially inner side of the groove bottom circle of the torque detection concave-convex section 27 is reduced. As a result, in the torque transmission performed based on the engagement between the teeth 22, 25 of the female stopper 21 and the male stopper 24, a torque that can be transmitted without causing the plastic torsional deformation of the torque detection concave-convex section 27 is small.

PRIOR ART DOCUMENT

Patent Document

Patent Document 1: WO2003/104065A1

SUMMARY OF INVENTION

Problem to be Solved by Invention

It is an object of the present invention to realize a structure in which diameters of respective components for torque detection and portions around them can be easily reduced while retaining the mechanical strength of a torque detection concave-convex section.

Means for Solving the Problem

According to an aspect of the present invention, an electric power steering apparatus includes an input shaft to which steering force from a steering wheel is applied; an output shaft to which auxiliary power generated by an electric motor is applied; a torsion bar provided on a radially inner side of the input shaft and the output shaft with the input shaft and the output shaft coaxially coupled to each other; and a torque detection sleeve. One of the input shaft and the output shaft includes a cylindrical portion provided at an end portion of the one of the input shaft and the output shaft that is coupled to the other of the input shaft and the output shaft. The cylindrical portion includes a female stopper provided on an inner peripheral surface of the cylindrical portion, the female stopper includes a plurality of female teeth and a plurality of female grooves, and the plurality of female teeth and the plurality of female grooves extend in an axial direction and are alternately arranged in a circumferential direction. The other of the input shaft and the output shaft includes a male stopper provided on an outer peripheral surface of an end portion of the other of the input shaft and the output shaft that is coupled to the one of the input shaft and the output shaft, and a torque detection concave-convex section provided on an outer peripheral surface of another portion the other of the input shaft and the output shaft that is adjacent to the male stopper with respect to the axial direction. The male stopper includes a plurality of male teeth and a plurality of male grooves, the plurality of male teeth and the plurality of male grooves extend in the axial direction and are alternately arranged in the circumferential direction, and the male stopper is engaged with the female stopper in a concave-convex engaging manner so as to be relatively rotatable in a given angle range. The torque detection concave-convex section includes a plurality of detection grooves, and the plurality of detection grooves extend in the axial direction and are arranged at equal intervals in the circumferential direction. The torque detection sleeve is arranged on a radially outer side of the torque detection concave-convex section and has a base end portion fitted and fixed on the cylindrical portion. A diameter of a groove bottom circle of the male stopper is smaller than a diameter of a groove bottom circle of the torque detection concave-convex section.

The number of the male grooves and the number of the detection grooves may be the same, and the male grooves and the detection grooves may be provided contiguously in the axial direction. The other of the input shaft and the output shaft may further include a step surface provided between a groove bottom of the male grooves and a groove bottom of the detection grooves. The step surface faces toward a side of the end portion of the other of the input shaft and the output shaft.

The other of the input shaft and the output shaft may further include an opposing surface provided on an outer peripheral surface of a portion of the other of the input shaft and the output shaft that is adjacent to the torque detection concave-convex section with respect to the axial direction. The opposing surface faces toward the side of the end portion of the other of the input shaft and the output shaft, and the opposing surface and a distal edge of the torque detection sleeve are opposed to each other in the axial direction. A portion of the step surface and portions of axial end faces of the female teeth may be opposed to each other in the axial direction, and a minimum axial distance between the portion of the step surface and the portions of the axial end faces of the female teeth may be smaller than a minimum axial distance between the opposing surface and the distal edge of the torque detection sleeve. In this way, the step surface and the axial end faces of the female teeth are allowed to contact each other during assembly.

Effects of Invention

According to the electric power steering apparatus described above, the diameter of the groove bottom circle of the male stopper is smaller than the diameter of the groove bottom circle of the torque detection concave-convex section. Therefore, for reducing the diameters of respective components for torque detection and portions around them, the diameter of the groove bottom circle of the male stopper can be reduced independently of the diameter of the groove bottom circle of the torque detection concave-convex section. Accordingly, the diameter of the groove bottom circle of the male stopper can be reduced while retaining the diameter of the groove bottom circle of the torque detection concave-convex section at a dimension sufficient for avoiding the plastic torsional deformation of the torque detection concave-convex section in the torque transmission performed based on the engagement between the teeth of the male stopper and the female stopper. As a result, the diameters of the respective components for the torque detection and portions around them can be easily reduced while securing the mechanical strength of a portion of the second one of the rotation shafts where the torque detection concave-convex section is provided.

With the step surface and the axial end faces of the female teeth being able to contact each other during the assembly, the distal edge of the torque detection sleeve can be prevented from hitting the opposing surface when the input shaft and the output shaft are relatively displaced in a direction in which the distal edge of the torque detection sleeve approaches the opposing surface along the axial direction. Specifically, the axial end faces of the female teeth contact the opposing surface before the distal edge of the torque detection sleeve hits the opposing surface. Therefore, the relative displacement between the input shaft and the output shaft in the approaching direction is stopped, and hence, the distal edge of the torque detection sleeve is prevented from hitting the opposing surface. Accordingly, the assembling work is improved.

EMBODIMENTS OF INVENTION

FIGS. 1 to 5 illustrate a first embodiment of the present invention. An electric power steering apparatus of this embodiment includes a steering column 6b, a steering shaft 5b,1 a housing 15a, an output shaft 16a, a torsion bar 19a, a torque detection sleeve 29a, a torque detection coil unit 31a, a substrate 35, an electric motor (see FIG. 6), and a worm speed reducer 34a.

Figure 1:
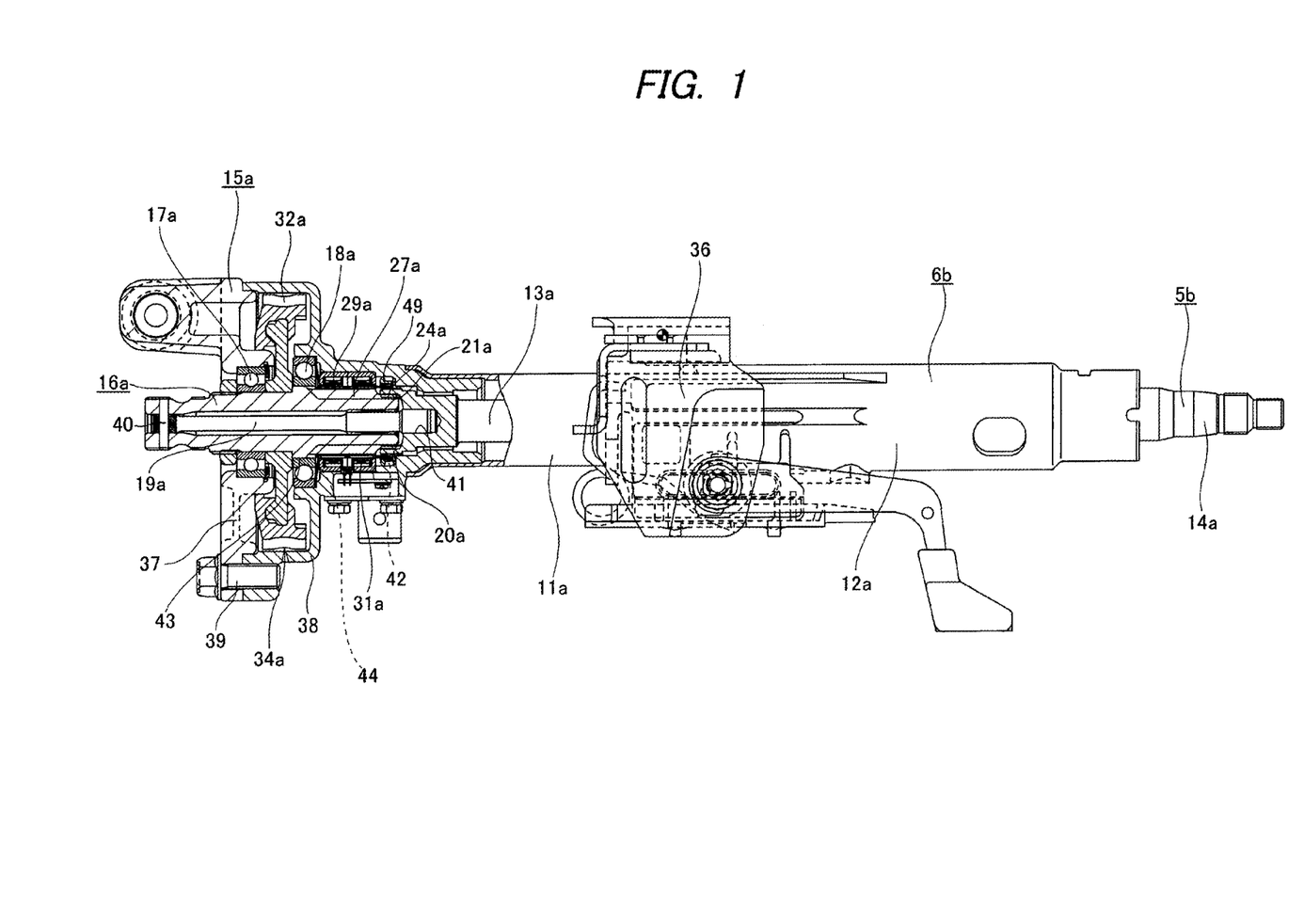
FIG. 1 is a partially-sectional side view illustrating a first embodiment of the present invention.

The steering column 6b is configured by combining, to be expandable, a cylindrical inner column 11a disposed in front and a cylindrical outer column 12a disposed behind, and is supported on a vehicle body by a support bracket 36. Both the inner and outer columns 11a and 12a are made of steel or light alloy such as aluminum alloy.

The steering shaft 5b is configured by spline-fitting an upper shaft 14a in the shape of a hollow shaft disposed behind in a lower shaft 13a disposed in front in such a manner that a torque can be transmitted and that relative displacement in the axial direction can be caused, and is rotatably supported inside the steering column 6b. The lower shaft 13a and the upper shaft 14a are made of steel. On the rear end portion of the upper shaft 14a protruded from a rear end opening of the outer column 12a, a steering wheel 1 (see FIG. 6) is fixed.

The housing 15a is configured by joining a cover 37 disposed in front and a body 38 disposed behind, both of which are made of light alloy such as aluminum alloy or a synthetic resin, to each other with a plurality of bolts 39, and is joined and fixed to the front end portion of the inner column 11a. The front end portion of the lower shaft 13a is inserted into the housing 15a.

The output shaft 16a is made of steel, that is, a magnetic metal, in the shape of a hollow shaft, and is rotatably supported by a pair of ball bearings 17a and 18a in front of the lower shaft 13a inside the housing 15a. The front end portion of the output shaft 16a protruded from a front end opening of the housing 15a is joined to a universal joint 7 (see FIG. 6).

Figure 2:
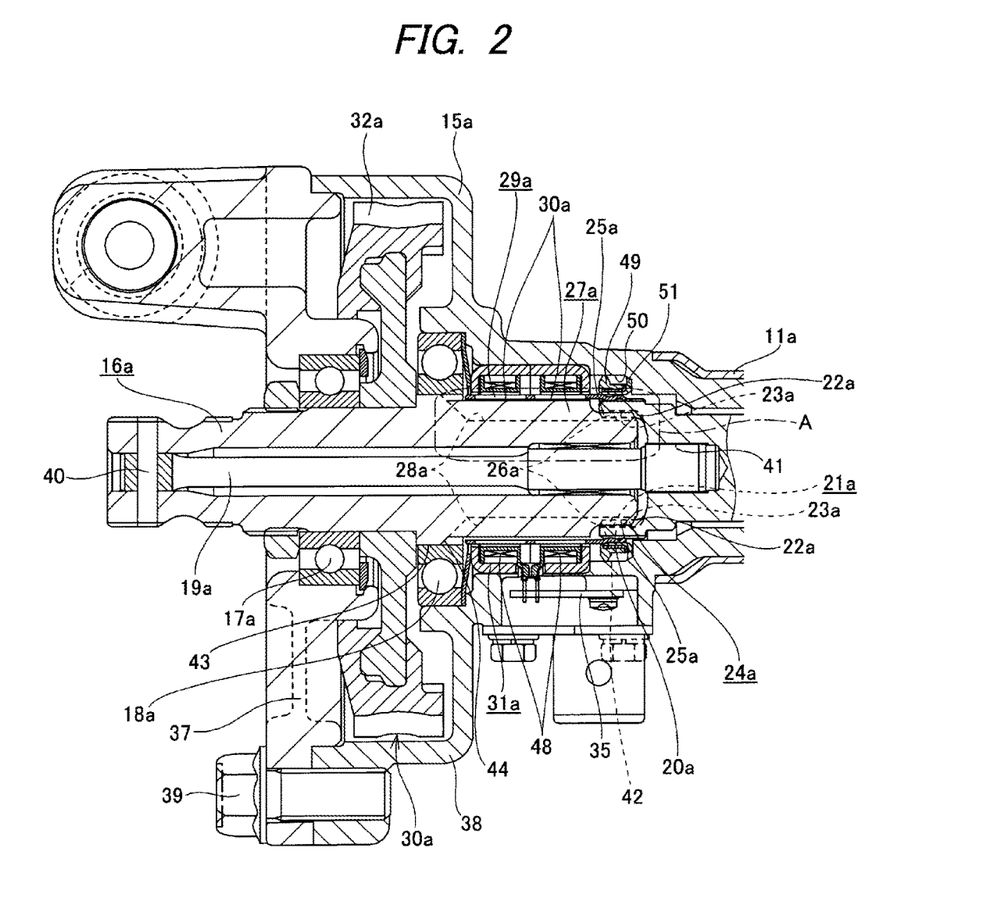
FIG. 2 is an enlarged view of a left end portion of FIG. 1.

The torsion bar 19a is made of spring steel. The torsion bar 19a links the lower shaft 13a (which is a rotation axis and corresponds to an example of an input shaft to which a steering force is applied by the steering wheel) and the output shaft 16a (which is a rotation axis and corresponds to an example of an output shaft to which auxiliary power is applied by using the electric motor as a source) coaxially to each other. Almost all the portion of the torsion bar 19a except its rear end portion is disposed on the radially inner side of the output shaft 16a, the front end portion thereof is joined to the portion of the output shaft 16a by a pin 40 a relatively unrotatable manner, and the rear end portion thereof is spline-fitted, in a relatively unrotatable manner, in a spline hole 41 provided in a radially center portion of the lower shaft 13a near its front end.

Figure 4:
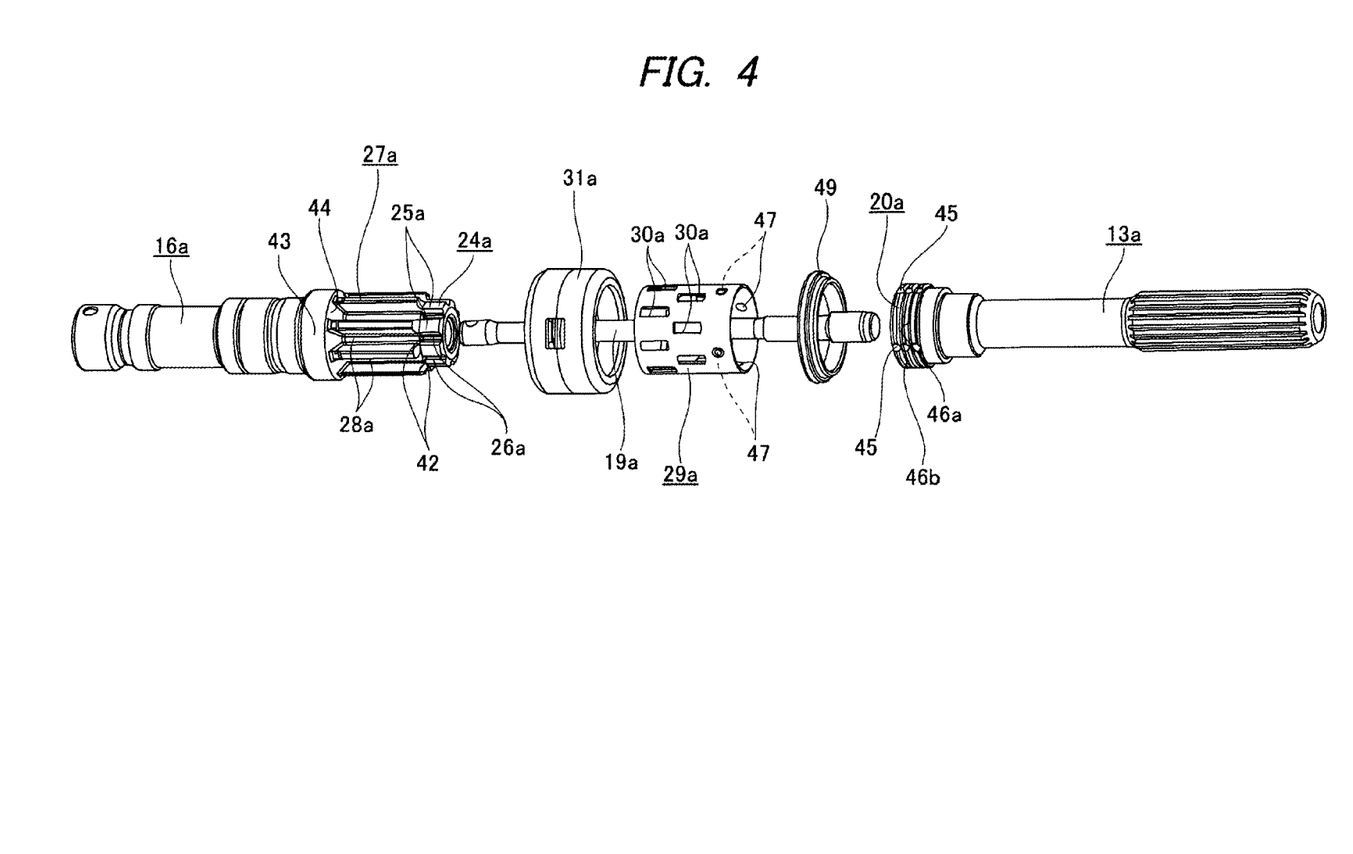
FIG. 4 is an exploded perspective view of a torque detection section.

The front end portion of the lower shaft 13a is provided with a circular cylindrical portion 20a. On the inner peripheral surface of the cylindrical portion 20a, a female stopper 21a having a concave-convex profile (a toothed gear shape) along the circumferential direction having an inscribed circle with a diameter larger than the spline hole 41 is provided. The female stopper 21a is configured by arranging, on the inner peripheral surface of the cylindrical portion 20a, a plurality of female teeth 22a and a plurality of female grooves 23a respectively extending in the axial direction alternately at equal pitches along the circumferential direction.

Figure 5:
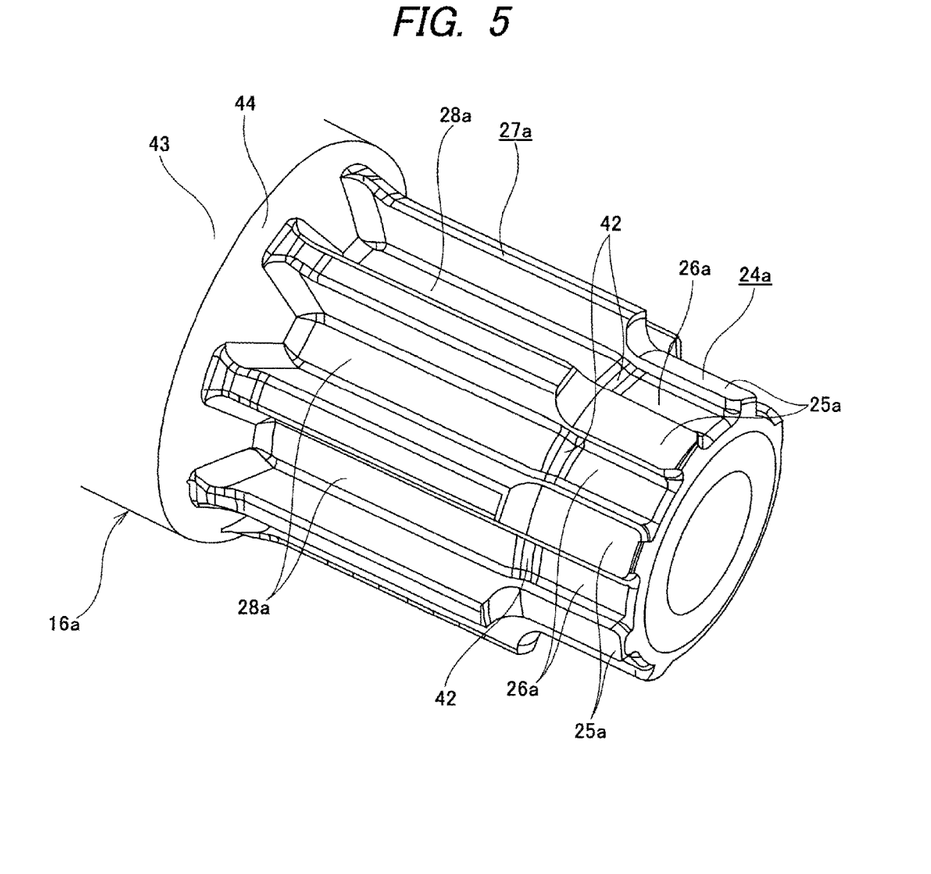
FIG. 5 is a perspective view of a rear portion of an output shaft.

On the other hand, in a rear end portion on the outer peripheral surface of the output shaft 16a, a male stopper 24a having a concave-convex profile (a toothed gear shape) along the circumferential direction having an outer diameter dimension (the diameter of a circumscribed circle) smaller than in a portion near its rear end (that is, a torque detection concave-convex section 27a which will be described later, a portion adjacent on the front side with respect to the axial direction) is provided. The male stopper 24a is configured by arranging, in the rear end portion on the outer peripheral surface of the output shaft 16a, a plurality of male teeth 25a and a plurality of male grooves 26a respectively extending in the axial direction alternately at equal pitches along the circumferential direction. The number of male teeth 25a (the male grooves 26a) and the number of female grooves 23a (the female teeth 22a) are the same.

The female stopper 21a and the male stopper 24a described above are engaged with each other in a concave-convex engaging manner (like a loose spline-engagement) so as to be relatively rotatable within a given angle range (e.g., ±5 degrees from a neutral state where the torsion bar 19a is not twisted). In other words, the female teeth 22a (the male teeth 25a) are loosely engaged with the male grooves 26a (the female grooves 23a) with a gap in the circumferential direction therebetween, so that the relative rotation of the lower shaft 13a and the output shaft 16a is restricted within the given angle range. Thus, the torsion bar 19a is prevented from excessively twisting.

An outer peripheral surface of a portion of the output shaft 16a near its rear end and adjacent to the front side of the male stopper 24a with respect to the axial direction is provided with the torque detection concave-convex section 27a having a concave-convex profile (a toothed gear shape) along the circumferential direction and having a circumscribed circle with a larger diameter than the male stopper 24a. This torque detection concave-convex section 27a is configured by providing, on the outer peripheral surface of the portion of the output shaft 16a near its rear end, a plurality of detection grooves 28a respectively extending in the axial direction at equal intervals in the circumferential direction. In the present embodiment, the number of detection grooves 28a and the number of the male grooves 26a are the same. The detection grooves 28a and the male grooves 26a are provided contiguously in the axial direction. In other words, the detection grooves 28a and the male grooves 26a are arranged in the same phase along the circumferential direction. Besides, in the present embodiment, a diameter d of a groove bottom circle of the male stopper 24a is smaller than a diameter D of a groove bottom circle of the torque detection concave-convex section 27a (d<D). Between the respective groove bottoms of the male grooves 26a and the respective groove bottoms of the detection grooves 28a, step surfaces 42 facing toward the rear side of the output shaft 16a (the rightward in FIGS. 1 to 3) are respectively provided. A radially outer side portion of each step surface 42 opposes a radially inner side portion of the axial end face (the front end face) of corresponding female tooth 22a, and a minimum axial distance between the opposing portions is T.

On the outer peripheral surface of the output shaft 16a, an engagement cylindrical surface portion 43 having an outer diameter dimension larger than that of the toque detecting concave-convex section 27a is provided on the front side of the torque detection concave-convex section 27a along the axial direction. An inner ring included in the ball bearing 18a is fitted outside and supported on the engagement cylindrical surface portion 43. Between the torque detection concave-convex section 27a and the engagement cylindrical surface portion 43, a large-diameter side step surface 44 (an example of an opposing surface) having a partial conical tubular shape is provided to face the rear end side (the right side in FIGS. 1 to 3) of the output shaft 16a.

The torque detection sleeve 29a is made of a nonmagnetic metal having conductivity, such as aluminum alloy, into a cylindrical shape, and is coaxially disposed on the radially outer side of the torque detection concave-convex section 27a. The base end portion (the rear end portion) of the torque detection sleeve 29a is fitted outside and fixed on the cylindrical portion 20a. For this purpose, in the example illustrated in the drawings, a plurality of axial grooves 45 respectively extending in the axial direction are provided at equal intervals in the circumferential direction on the outer peripheral surface of the cylindrical portion 20a. On an outer peripheral surface of a portion of the cylindrical portion 20a overlapping, in the radial direction, a region where the female and male stoppers 21a and 24a are engaged with each other, a pair of circumferential grooves 46a, 46b respectively extending in the circumferential direction are provided over the whole circumference. When a plurality of projections 47 provided on the inner peripheral surface of the portion of the torque detection sleeve 29a near its base end are respectively caught by the axial grooves 45, the torque detection sleeve 29a is prevented from rotating against the cylindrical portion 20a. The base end edge and the portion of the torque detection sleeve 29a near its base end are tightly pressed in the circumferential grooves 46a, 46b, so that the torque detection sleeve 29a is positioned and prevented from displacing from the cylindrical portion 20a in the axial direction.

In a portion corresponding to a distal end portion (a front end portion) to an intermediate portion of the torque detection sleeve 29a, that is, a portion of the torque detection sleeve 29a disposed on the radially outer side of the torque detection concave-convex section 27a, a plurality of substantially rectangular window holes 30a are provided in double rows in the axial direction and at equal intervals in the circumferential direction. The phases in the circumferential direction of the two rows of the window holes 30a are shifted by a half pitch from each other. The portion of the torque detection sleeve 29a disposed on the radially outer side of the torque detection concave-convex section 27a has an inner diameter dimension larger, by approximately 0.5 mm, than the diameter (the outer diameter dimension) of the circumscribed circle of the torque detection concave-convex section 27a. The distal edge of the torque detection sleeve 29a opposes the large-diameter side step surface 44 in the axial direction, and a minimum axial distance between these opposing portions is S. In particular, in the present embodiment, the minimum distance T in the axial direction is smaller than this minimum distance S in the axial direction (T<S).

The torque detection coil unit 31*a* is configured to have a cylindrical shape, and is coaxially disposed on the radially outer side of the torque detection concave-convex section 27*a* and the torque detection sleeve 29*a*. The torque detection coil unit 31*a* is fitted in and fixed on the housing 15*a*, and includes a pair of coils 48. These coils 48 are disposed to overlap, in the radial direction, a portion of the torque detection sleeve 29*a* where the double rows of the window holes 30*a* are provided.

The substrate 35 is disposed below the torque detection coil unit 31*a* in the housing 15*a*. A motor control circuit is formed on the substrate 35. The motor control circuit is connected to ends of the coils 48.

The worm speed reducer 34*a* is configured by combining a worm wheel 32*a* and a worm not shown. The worm wheel 32*a* is fitted outside and fixed on a substantially center of the output shaft 16*a* in the axial direction corresponding to a portion of the output shaft 16*a* disposed between the ball bearings 17*a* and 18*a*. The worm not shown is engaged with the worm wheel 32*a* and rotatably supported in the housing 15*a*.

The electric motor 10 (see FIG. 6) is supported and fixed in the housing 15*a*. The output shaft of the electric motor 10 is joined to the base end portion of the worm not shown so as to be capable of transmitting a torque.

In a portion between the outer peripheral surface of the base end portion of the torque detection sleeve 29*a* and the inner surface of the housing 15*a*, a seal ring 49 for preventing a lubricant used in the housing 15*a* from flowing out to a space on the radially inner side of the steering column 6*b* is provided. The seal ring 49 is fitted outside and fixed on the base end portion of the torque detection sleeve 29*a*, and its forked end edges are in sliding contact, over the whole circumference, with a cylindrical inner peripheral surface 50 and a step surface 51 facing forward (opposing the rear end portion of the seal ring 49 in the axial direction) that are disposed adjacent to each other at a portion of the inner surface of the housing 15*a* near its rear end.

In the electric power steering apparatus configured as described above, when a torque corresponding to a steering force is applied to the steering shaft 5*b* by a driver operating the steering wheel 1, the torsion bar 19*a* is elastically twisted (within a given angle range) in accordance with the direction and the size of this torque. This elastic twist changes the positional relationship in the circumferential direction between the torque detection concave-convex section 27*a* and the torque detection sleeve 29*a*, and hence an impedance change is caused in the coils 48 included in the torque detection coil unit 31*a*. On the basis of this impedance change, the direction and the size of the torque can be detected. The motor control circuit built on the substrate 35 uses the result of the torque detection thus obtained for controlling electricity supply to the electric motor 10, so that the electric motor 10 can generate auxiliary power in accordance with the direction and the size of the torque. The auxiliary power is increased by the worm speed reducer 34*a* and then applied to the output shaft 16*a*. As a result, the force required for the driver to operate the steering wheel 1 can be reduced.

On the other hand, when the amount of twist of the torsion bar 19*a* reaches an upper limit value on one side or the other side of the given angle range because of a large torque input from the steering wheel 1 to the steering shaft 5*b*, the female stopper 21*a* and the male stopper 24*a* are engaged with each other in the circumferential direction. Then, on the basis of this engagement, a part of the toque is directly transmitted from the lower shaft 13*a* to the output shaft 16*a*.

In the electric power steering apparatus of the present embodiment configured as described above, if the diameter of the circumscribed circle of the torque detection concave-convex section 27*a* is to be reduced for reducing the diameters of the respective components for the torque detection and portions around them, it is necessary to reduce the inner diameter dimension of the torque detection sleeve 29*a* in accordance with the diameter of the circumscribed circle of the torque detection concave-convex section 27*a*. Besides, it is necessary to reduce the outer diameter dimension of the cylindrical portion 20*a*, on which the base end portion of the torque detection sleeve 29*a* is fitted and fixed, in accordance with the inner diameter dimension of the torque detection sleeve 29*a*. In this case, if the outer diameter dimension of the cylindrical portion 20*a* is to be reduced without changing the thickness in the radial direction of a portion of the cylindrical portion 20*a* disposed on the radially outer side of the groove bottom circle of the female stopper 21*a* and the height in the radial direction of the respective female teeth 22*a* for retaining the mechanical strength of the cylindrical portion 20*a*, it is necessary to also reduce the diameter of the circumscribed circle and the diameter d of the groove bottom circle of the male stopper 24*a* in accordance with the radial dimension of the cylindrical portion 20*a* for avoiding interference between the tooth tops and the groove bottoms of the female stopper 21*a* and the male stopper 24*a*.

In this case, in the configuration employed by the electric power steering apparatus of the present embodiment, without making the diameter d of the groove bottom circle of the male stopper 24*a* and the diameter D of the groove bottom circle of the torque detection concave-convex section 27*a* equal to each other (d=D), the diameter d of the groove bottom circle of the male stopper 24*a* is made to be smaller than the diameter D of the groove bottom circle of the torque detection concave-convex section 27*a* (d<D). Therefore, for reducing the diameters of the respective components for the torque detection and portions around them, the diameter d of the groove bottom circle of the male stopper 24*a* can be reduced independently of the diameter D of the groove bottom circle of the torque detection concave-convex section 27*a*. Accordingly, the diameter d of the groove bottom circle of the male stopper 24*a* can be reduced while retaining the diameter D of the groove bottom circle of the torque detection concave-convex section 27*a* at a dimension sufficient for securing the mechanical strength of the portion of the output shaft 16*a* near its rear end where the torque detection concave-convex section 27*a* is provided, namely, a dimension sufficient for avoiding the plastic torsional deformation of the torque detection concave-convex section 27*a* in the torque transmission performed based on the engagement between the teeth 22*a* and 25*a* of the male stopper 24*a* and the female stopper 21*a*. As a result, the diameters of the respective components for the torque detection and portions around them can be easily reduced while securing the mechanical strength of the portion of the output shaft 16*a* near its rear end where the torque detection concave-convex section 27*a* is provided.

Figure 3:
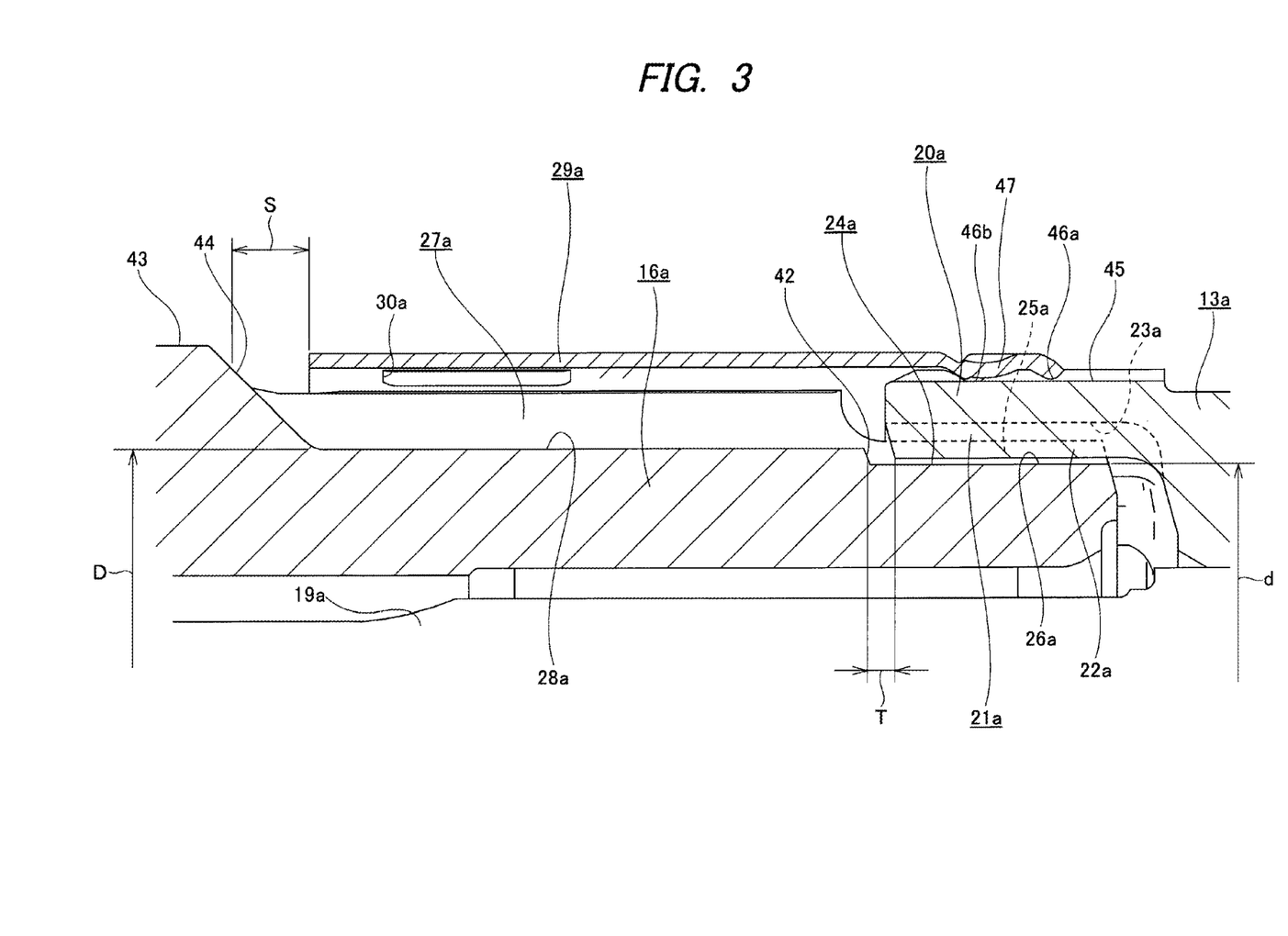
FIG. 3 is a partially-omitted enlarged view of a portion A of FIG. 2.

In this embodiment, in a state after completing the assembly as illustrated in FIGS. 1 to 3, the relative displacement between the lower shaft 13*a* and the output shaft 16*a* in a mutually approaching direction along the axial direction is restricted by the torsion bar 19*a* and the pin 40. On the other hand, during the assembly when such relative displacement is not restricted, the relative displacement may be caused between the lower shaft 13a and the output shaft 16a in some cases so that they may become closer to each other in the axial direction as compared with the state illustrated in FIGS. 1 to 3. In the present embodiment, however, even if this relative displacement in the approaching direction occurs, the distal edge of the torque detection sleeve 29a is prevented from hitting the large-diameter side step surface 44. Specifically, since the aforementioned dimensional relationship T<S is employed in this embodiment, when there is a relative displacement in the approaching direction as described above, the axial end faces of the female teeth 22a contact the step surfaces 42 before the distal edge of the torque detection sleeve 29a hits the large-diameter side step surface 44. Therefore, the relative displacement between the lower shaft 13a and the output shaft 16a in the approaching direction is stopped, and hence, the distal edge of the torque detection sleeve 29a is prevented from hitting the large-diameter side step surface 44. Accordingly, the assembling workability is be improved.

In producing the structure of this embodiment, in order to suppress processing cost necessary for providing a difference in the diameter between the groove bottom circle of the torque detection concave-convex section 27a and the groove bottom circle of the male stopper 24a, the torque detection concave-convex section 27a and the male stopper 24a are preferably molded simultaneously by plastic working such as forging processing or roll-forming processing. As the processing for providing the diameter difference, however, machining such as cutting may be employed.

INDUSTRIAL APPLICABILITY

In each embodiment described above, the present invention is applied to a structure in which the output shaft to which auxiliary power is applied is coupled to the lower shaft (the input shaft) of the steering shaft. The present invention is, however, applicable to a structure in which an output shaft to which auxiliary power is applied is coupled to an input shaft of a steering gear unit. The present invention is applicable also to a structure in which an output shaft is provided with a cylindrical portion having a female stopper and an input shaft is provided with a male stopper as in the conventional structure described above.

This application is based on the Japanese Patent Application No. 2013-125271 filed on Jun. 14, 2013, the entire content of which is incorporated herein by reference.

DESCRIPTION OF REFERENCE SIGNS 1 steering wheel
2 steering gear unit
3 input shaft
4 tie rod
5, 5a, 5b steering shaft
6, 6a, 6b steering column
7 universal joint
8 intermediate shaft
9 universal joint
10 electric motor
11, 11a inner column
12, 12a outer column
13, 13a lower shaft
14, 14a upper shaft
15, 15a housing
16, 16a output shaft
17, 17a ball bearing
18, 18a ball bearing
19, 19a torsion bar
20, 20a cylindrical portion
21, 21a female stopper
22, 22a female tooth
23, 23a female groove
24, 24a male stopper
25, 25a male tooth
26, 26a male groove
27, 27a torque detection concave-convex section
28, 28a detection groove
29, 29a torque detection sleeve
30, 30a window hole
31, 31a torque detection coil unit
32, 32a worm wheel
33 worm
34, 34a worm speed reducer
35 substrate
36 support bracket
37 cover
38 body
39 bolt
40 pin
41 spline hole
42 step surface
43 engagement cylindrical surface portion
44 large-diameter side step surface
45 axial groove
46a, 46b circumferential groove
47 projection
48 coil
49 seal ring
50 inner peripheral surface
51 step surface

The invention claimed is:
1. An electric power steering apparatus comprising:
an input shaft to which a steering force from a steering wheel is applied;
an output shaft to which auxiliary power generated by an electric motor is applied;
a torsion bar provided in a radially inner side of the input shaft and the output shaft and coaxially coupling the input shaft and the output shaft to each other; and
a torque detection sleeve,
wherein one of the input shaft and the output shaft comprises a cylindrical portion provided at an end portion of the one of the input shaft and the output shaft that is coupled to the other of the input shaft and the output shaft,
wherein the cylindrical portion comprises a female stopper provided on an inner peripheral surface of the cylindrical portion, the female stopper comprising a plurality of female teeth and a plurality of female grooves, and the plurality of female teeth and the plurality of female grooves extending in an axial direction and being alternately arranged in a circumferential direction,
wherein the other of the input shaft and the output shaft comprises a male stopper provided on an outer peripheral surface of an end portion of the other of the input shaft and the output shaft that is coupled to the one of the input shaft and the output shaft, and a torque detection concave-convex section provided on an outer peripheral surface of another portion the other of the input shaft and the output shaft that is adjacent to the male stopper with respect to the axial direction, wherein the male stopper comprises a plurality of male teeth and a plurality of male grooves, the plurality of male teeth and the plurality of male grooves extending in the axial direction and being alternately arranged in the circumferential direction, and the male stopper being engaged with the female stopper in a concave-convex engaging manner so as to be relatively rotatable in a given angle range, wherein the torque detection concave-convex section comprises a plurality of detection grooves, the plurality of detection grooves extending in the axial direction and being arranged at equal intervals in the circumferential direction, wherein the torque detection sleeve is arranged on a radially outer side of the torque detection concave-convex section, the torque detection sleeve comprising a base end portion fitted and fixed on the cylindrical portion, wherein a diameter of a groove bottom circle of the male stopper is smaller than a diameter of a groove bottom circle of the torque detection concave-convex section, and wherein the other of the input shaft and the output shaft further comprises a step surface provided between a groove bottom of the male grooves and a groove bottom of the detection grooves.

2. The electric power steering apparatus according to claim 1, wherein the number of the male grooves and the number of the detection grooves are the same, wherein the male grooves and the detection grooves are provided contiguously in the axial direction, and wherein the step surface faces toward a side of the end portion of the other of the input shaft and the output shaft.

3. The electric power steering apparatus according to claim 2, wherein the other of the input shaft and the output shaft further comprises an opposing surface provided on an outer peripheral surface of a portion of the other of the input shaft and the output shaft that is adjacent to the torque detection concave-convex section with respect to the axial direction, the opposing surface facing toward the side of the end portion of the other of the input shaft and the output shaft, and the opposing surface and a distal edge of the torque detection sleeve being opposed to each other in the axial direction, wherein a portion of the step surface and portions of axial end faces of the female teeth are opposed to each other in the axial direction, and wherein a minimum axial distance between the portion of the step surface and the portions of the axial end faces of the female teeth is smaller than a minimum axial distance between the opposing surface and the distal edge of the torque detection sleeve, so that the step surface is allowed to contact the axial end faces of the female teeth during assembly.

4. The electric power steering apparatus according to claim 1, wherein the diameter of the groove bottom circle of the male stopper is smaller than a smallest diameter of the groove bottom circle of the torque detection concave-convex section.

5. The electric power steering apparatus according to claim 1, wherein the diameter of the groove bottom circle of the torque detection concave-convex section is at a portion of the groove bottom circle of the torque detection concave-convex section closest to the male stopper in the axial direction.

* * * * *